(12) United States Patent
Mochizuki et al.

(10) Patent No.: US 8,047,750 B2
(45) Date of Patent: Nov. 1, 2011

(54) BEARING UNIT AND MAIN SPINDLE DEVICE OF MACHINE TOOL PROVIDED WITH BEARING UNIT

(75) Inventors: Akihiro Mochizuki, Yamatokoriyama (JP); Hidenori Saraie, Yamatokoriyama (JP); Kazuya Fujioka, Yamatokoriyama (JP); Takahiro Nishiki, Yamatokoriyama (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 1027 days.

(21) Appl. No.: 11/979,841

(22) Filed: Nov. 8, 2007

(65) Prior Publication Data

US 2008/0112769 A1    May 15, 2008

(30) Foreign Application Priority Data

Nov. 9, 2006  (JP) ................. 2006-304382

(51) Int. Cl.
*B23C 1/00* (2006.01)
(52) U.S. Cl. ......... 409/231; 409/233; 384/126; 384/624
(58) Field of Classification Search .................. 384/126, 384/624; 409/135–136, 231–233
See application file for complete search history.

(56) References Cited

U.S. PATENT DOCUMENTS

| 1,448,189 | A | | 3/1923 | Brunner | |
|---|---|---|---|---|---|
| 3,393,022 | A | * | 7/1968 | Alven et al. | 384/127 |
| 4,551,032 | A | * | 11/1985 | Mottershead | 384/517 |
| 4,611,934 | A | * | 9/1986 | Piotrowski et al. | 384/517 |
| 5,125,234 | A | | 6/1992 | Yonezawa et al. | |
| 6,176,620 | B1 | * | 1/2001 | Obara | 384/127 |
| 6,420,809 | B1 | * | 7/2002 | Obara | 310/90 |
| 7,458,728 | B2 | * | 12/2008 | Kitamura et al. | 384/462 |
| 2001/0003546 | A1 | * | 6/2001 | Watanabe et al. | 384/517 |
| 2005/0232720 | A1 | | 10/2005 | Lu | |

FOREIGN PATENT DOCUMENTS

| JP | 01092005 A | * | 4/1989 |
|---|---|---|---|
| JP | 01135916 A | * | 5/1989 |
| JP | 4-19413 A | | 1/1992 |

* cited by examiner

*Primary Examiner* — Daniel Howell
(74) *Attorney, Agent, or Firm* — Smith Patent Office

(57) ABSTRACT

A bearing unit capable of withstanding a large axial force based on a simple structure including: a bearing 10 having an internal ring 13 fitted to an inside member 2, an outer ring 14 fitted to an outside member 6, lots of rolling elements 15 disposed between the outer ring 14 and the inner ring 13; and a transmitting direction shifting means A transmitting an axial force F from the inner ring 13 to the outside member 6 when the axial force F transmitted from the inside member 2 to the internal ring 13 exceeds a predetermined value or above, and a main spindle device of a machine tool, which is provided with the bearing unit, are provided.

5 Claims, 7 Drawing Sheets

FRONT SIDE

REAR SIDE

FRONT SIDE

REAR SIDE

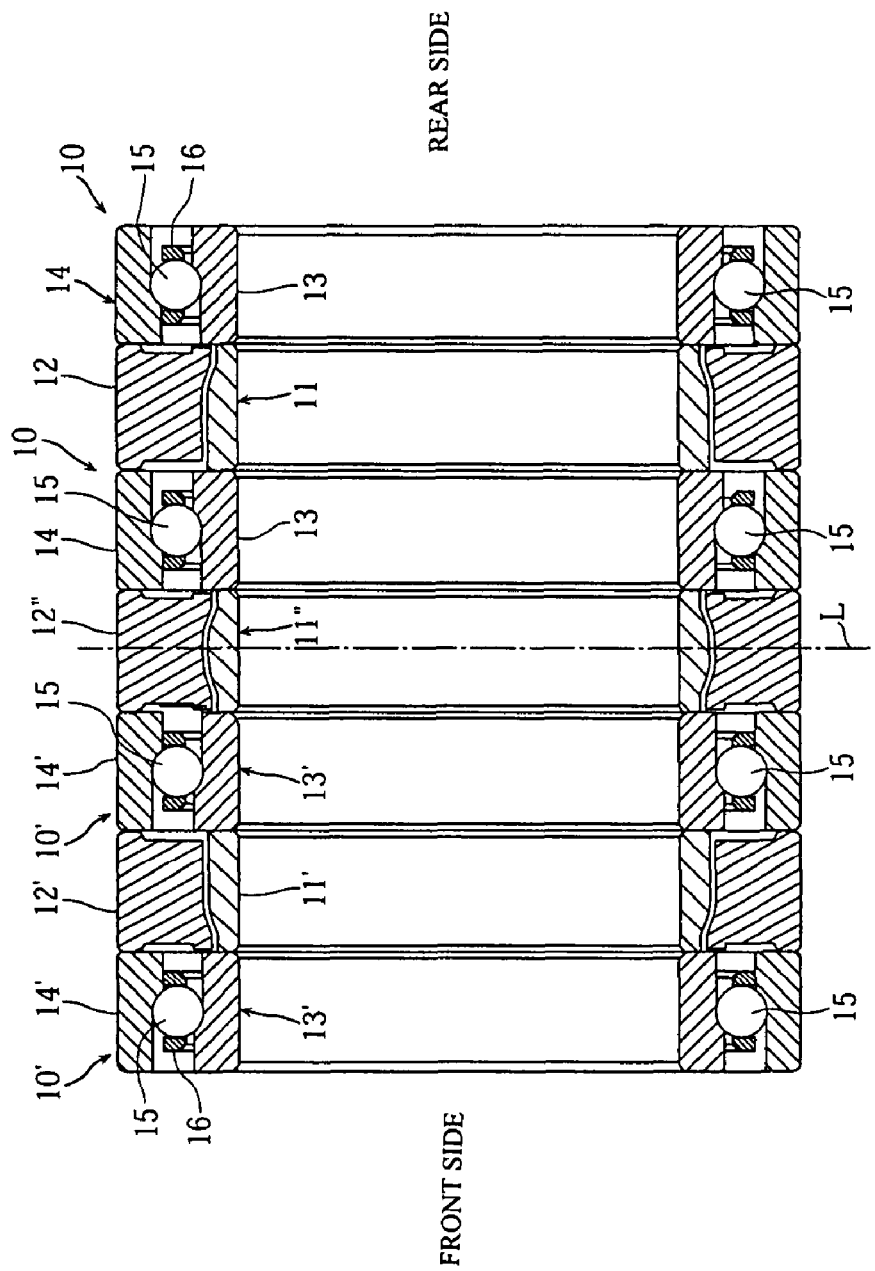

BEARING UNIT AND MAIN SPINDLE DEVICE OF MACHINE TOOL PROVIDED WITH BEARING UNIT

BACKGROUND OF THE INVENTION

1. Field of the Invention

The present invention relates to a bearing unit including a bearing formed by disposing lots of rolling elements between an inner ring and an outer ring and an axial force transmitting direction shifting means shifting a transmission path of an axial force, and a main spindle device of a machine tool, which is provided with the bearing unit.

2. Description of the Related Art

In a bearing of a type having lots of rolling elements disposed between an inner ring fitted to a rotary shaft and an outer ring fitted to a housing side, for example an angular ball bearing, an axial force acting on the rotary shaft is transmitted from the rotary shaft to the housing side via the inner ring, the rolling elements (balls) and the outer ring. In that case, when the axial force exceeds a predetermined allowable axial load, there arises a problem that an indentation is generated in an orbital plane, and the like.

With respect to a bearing for a main spindle of a machine tool, a large axial force (unclamping force) acts due to a tool exchange and so forth. When this unclamping force exceeds the above-described allowable axial load, the above-described problem is possibly caused. Therefore, in order to avoid the above-described problem, among conventional main spindle devices of machine tools, there is one provided with an unclamping force support mechanism so as to prevent the unclamping force acting on between the main spindle when exchanging the tool from acting on between the inner ring, the outer ring and the rolling elements (see Patent document 1).

[Patent document 1] Japanese Patent Application Laid-Open No. Hei 4-019413

The above-described mechanism of supporting the unclamping force needs a structure not interrupting rotation of the main spindle at a normal operation but supporting the unclamping force to the main spindle surely at the time of the tool exchange, causing problems of increasing costs due to the complicated structure as well as requiring a relatively large space to be disposed.

SUMMARY OF THE INVENTION

The present invention has been made in consideration of the above-described conventional problems, and an object thereof is to provide a bearing unit capable of withstanding a large axial force based on a simple structure and a main spindle device of a machine tool, which is provided with the bearing unit.

In the present invention, a bearing unit includes: a bearing having an inner ring fitted to an inside member, an outer ring fitted to an outside member, and lots of rolling elements disposed between the outer ring and the inner ring; and a transmitting direction shifting means transmitting an axial force from the inner ring to the outside member or from the outer ring to the inside member when the axial force transmitted from the inside member or the outside member to the inner ring or the outer ring becomes to a predetermined value or above.

In the present invention, the transmitting direction shifting means is provided, therefore, when the axial force transmitted from the inside member or the outside member to the inner ring or the outer ring becomes to a predetermine value or above, the axial force is transmitted from the inner ring to the outside member or from the outer ring to the inside member, so that excessive axial force is prevented from acting on the rolling elements and the problem that the formation of the indentation of the rolling elements on an orbital plane of the inner ring or the outer ring can be prevented.

Further, the transmitting direction shifting means according to the present invention is of a structure simply changing the axial force transmitted from the inside member or the outside member to the inner ring or the outer ring into the axial force transmitted from the inner ring to the outside member or from the outer ring to the inside member, having a simpler structure as compared to the conventional devices like an unclamping force support mechanism supporting the unclamping force acting on the main spindle at the time of the above-described tool exchange, so that the problem of increasing the space to be disposed is not caused.

In a preferred embodiment of the present invention, the inside member is a rotary shaft and the outside member is a housing; the transmitting direction shifting means includes an inner ring spacer disposed at the rotary shaft side and restricting an axial movement of the inner ring and an outer ring spacer disposed at the housing side and restricting an axial movement of the outer ring; and it is structured so that the elastic deformation amount of the inner ring, the outer ring, the rolling elements and the inner ring spacer becomes to a level that the inner ring abuts onto the outer ring spacer when the axial force acting on the inner ring becomes to the predetermined value or above.

In the embodiment in which the above-described characteristics are described, the transmitting direction shifting means is structured such that the elastic deformation amount of the inner ring, the outer ring, the rolling elements and the inner ring spacer becomes to the level that the inner ring abuts onto the outer ring spacer when the axial force acting on the inner ring becomes to the predetermined value or above, allowing the transmitting direction of the axial force to be shifted from the inner ring side to the outer ring spacer side, so that a concrete structure capable of realizing an operation and effect of the present invention can be provided.

In another preferred embodiment of the present invention, the inside member is a fixed shaft and the outside member is a rotating cylindrical body; the transmitting direction shifting means includes the inner ring spacer disposed at the fixed shaft side and restricting the axial movement of the inner ring and the outer ring spacer disposed at the rotating cylindrical body side and restricting the axial movement of the outer ring; and it is structured so that, when the axial force acting on the inner ring becomes to the predetermined value or above, the elastic deformation amount of the inner ring, the outer ring, the rolling elements and the inner ring spacer becomes to the level that the outer ring abuts onto the inner ring spacer.

In the embodiment in which the above-described characteristics are described, the transmitting direction shifting means is structured such that the elastic deformation amount of the inner ring, the outer ring, the rolling elements and the inner ring spacer becomes to the level that the outer ring abuts onto the inner ring spacer when the axial force acting on the outer ring becomes to the predetermined value or above, allowing the transmitting direction of the axial force to be shifted from the outer ring side to the inner ring spacer side, so that the concrete structure capable of realizing the operation and effect of the present invention can be provided.

In still another preferred embodiment of the present invention, two pieces of the bearings according to the present invention are provided, and the transmitting direction shifting means formed by the inner ring spacer and the outer ring spacer and structured such that the elastic deformation amount of the inner ring, the outer ring, the rolling elements and the inner ring spacer becomes to the level that the inner ring abuts onto the outer ring spacer when the axial force acting on the inner ring becomes to the predetermined value or above is disposed between both the bearings.

In the embodiment in which the above-described characteristics are described, since two pieces of the bearings according to the present invention are provided, and the above-described transmitting direction shifting means formed by the inner ring spacer and the outer ring spacer is provided between both the bearings, so that the axial force can be transmitted in the direction from the inner ring side of one bearing to the outer ring of the other bearing via the outer ring spacer, and further to the housing side when the pair of bearings are provided.

A main spindle device of a machine tool according to still another preferred embodiment of the present invention includes: a main spindle driving to rotate a tool fitted to a end portion thereof; a draw bar unit disposed in the main spindle and clamping/unclamping the tool with respect to the end portion of said main spindle; a housing supporting the main spindle; and a bearing unit according to the present invention being disposed between the housing and the main spindle.

In the main spindle device of the machine tool, in which the above-described characteristics are described, in the case where the main spindle is supported by the housing and at the same time the draw bar unit is disposed in the main spindle and it is structured such that the unclamping force acts on the draw bar when exchanging the tool, since the bearing unit according to the present invention is provided between the main spindle and the housing, therefore the unclamping force transmitted from the main spindle to the bearing can be transmitted from the inner ring to the outer ring via the outer ring spacer and further to the housing. Accordingly, it is possible to prevent the unclamping force from being transmitted directly to the orbital plane and the rolling elements of the bearing on the basis of the simple structure without increasing the space to dispose, so that the bearing can be prevented from reducing its useful time due to the unclamping force.

BRIEF DESCRIPTION OF THE DRAWINGS

FIG. 7 is a sectional side view showing another modification example of the bearing unit.

DETAILED DESCRIPTION OF THE PREFERRED EMBODIMENTS

Figure 1:
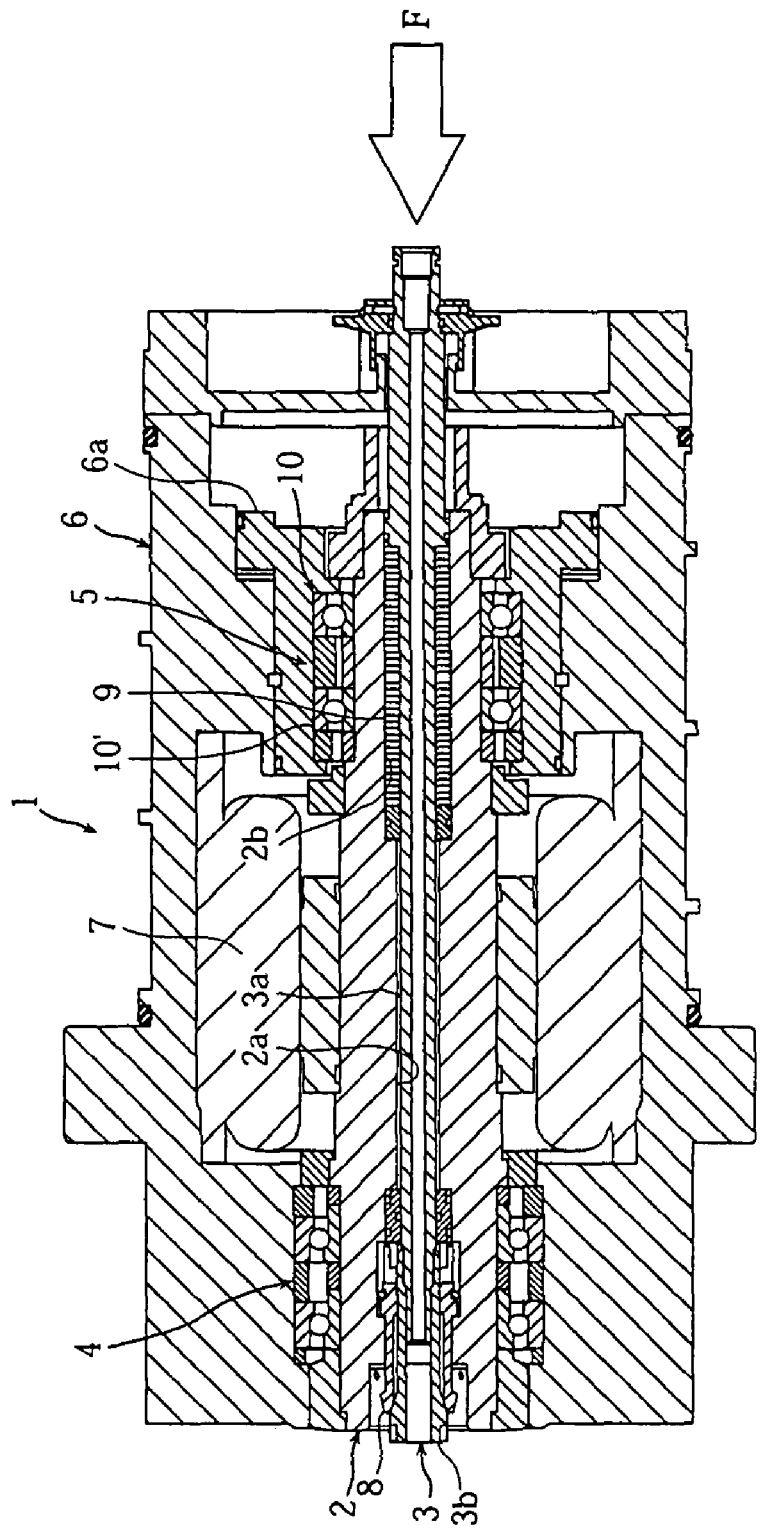
FIG. 1 is a sectional side view schematically showing a main spindle device with a bearing unit according to one embodiment of the present invention.
Figure 2:
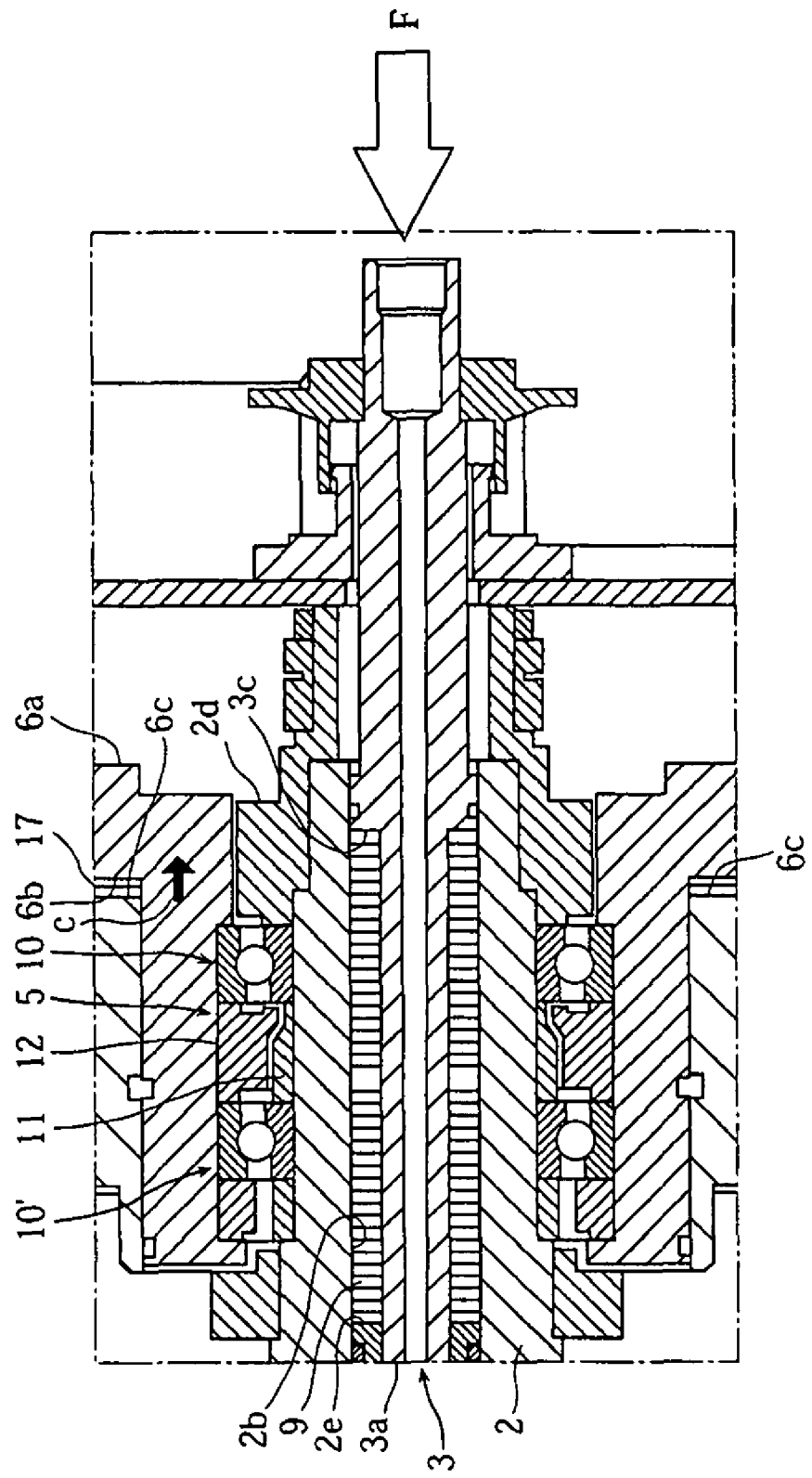
FIG. 2 is a sectional side view schematically showing the part of the bearing unit of the main spindle device.
Figure 3:
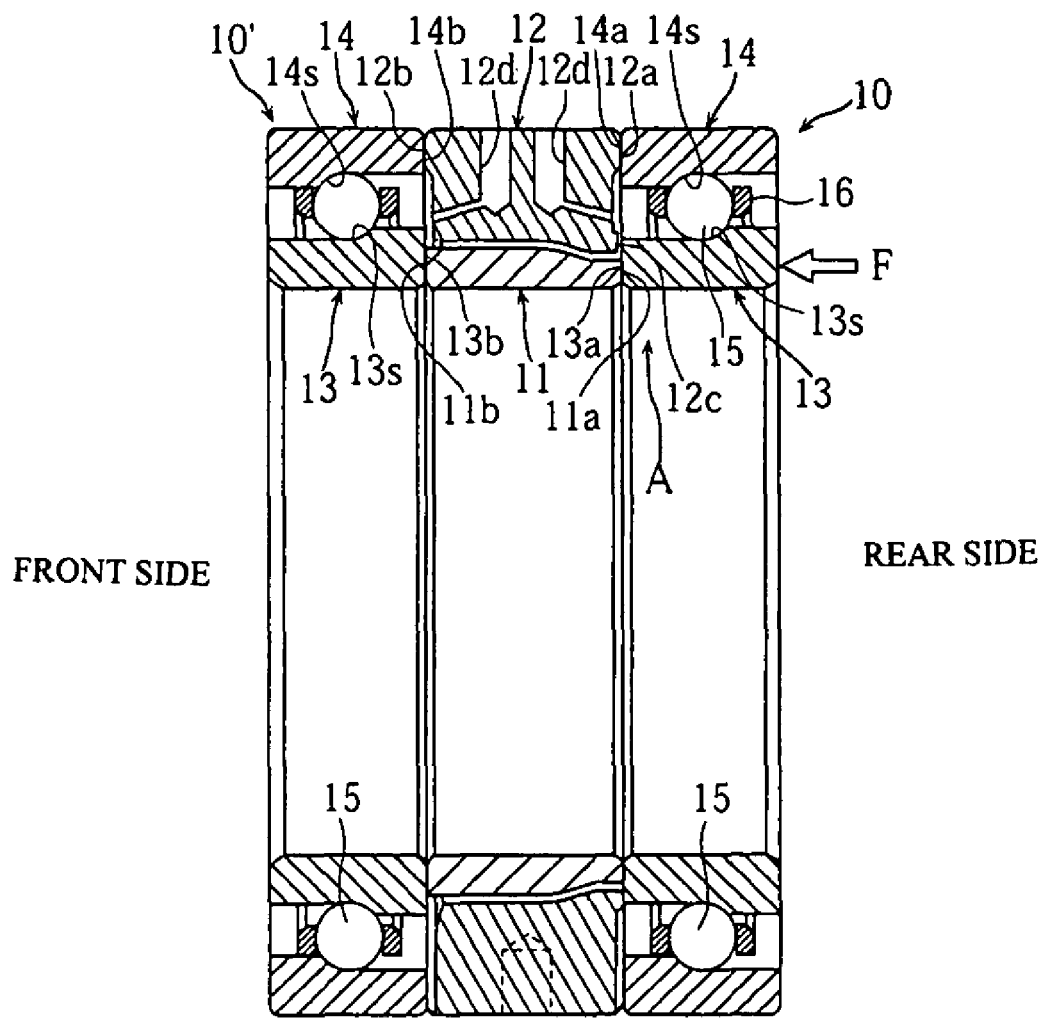
FIG. 3 is a sectional side view of the bearing unit.
Figure 4:
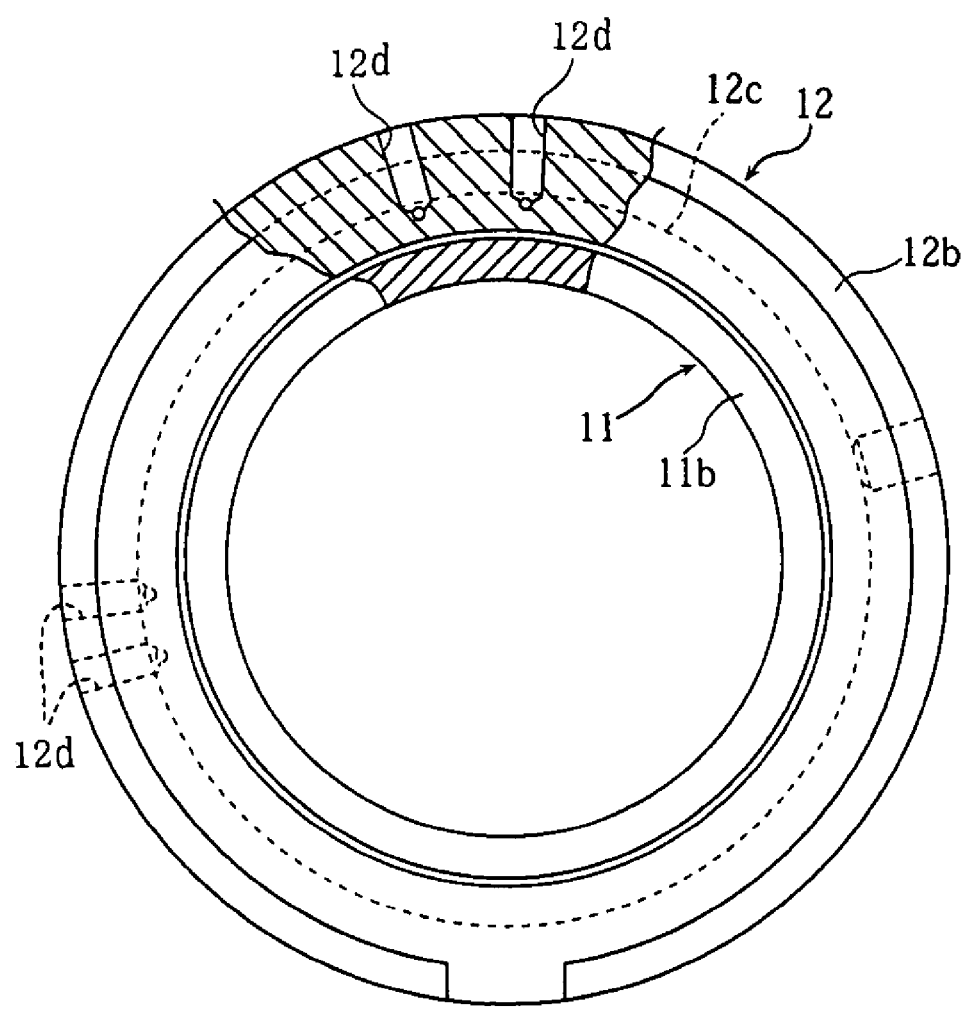
FIG. 4 is a front view of inner and outer ring spacers of the bearing unit.

Hereinafter, embodiments of the present invention will be described with reference to the attached drawings. FIG. 1 to FIG. 5 are views to illustrate a main spindle device of a machine tool, which is provided with a bearing unit according to a first embodiment.

In the drawings, "1" denotes a main spindle device of a machine tool, and the main spindle device 1 includes: a main spindle 2, a draw bar unit 3 disposed in an inserted manner into a draw hole 2a formed at an axial core of the main spindle 2, a housing 6 supporting in a freely rotatable manner the main spindle 2 via an front bearing unit 4 and a rear bearing unit 5. Note that "7" is a main spindle motor of a built-in type intervened between the housing 6 and the main spindle 2, and the main spindle 2 is driven to rotate by the spindle motor 7.

The draw bar unit 3 is structured to expand/contract a collet chuck 8 disposed at a end portion of the draw hole 2a with a locking member 3b attached to a tip of a draw bar 3a being inserted into the draw hole 2a in an axially movable manner forward and backward. When the draw bar 3a is moved backward in a cramping direction (rightward in FIG. 1), the collet chuck 8 engages with a locking groove of a tool (not shown) to clamp the tool at the end portion of the main spindle 2, and when it is moved forward in a unclamping direction (leftward in FIG. 1), the above engagement is released and the tool is unclamped from the main spindle 2.

Here, between a stepped portion 3c of the draw bar 3a and a stepped portion 2e of a large-diameter portion 2b of the draw hole 2a of the main spindle 2, a lot of disk springs 9 biasing the draw bar 3a in the clamping direction at a required clamping force are made to intervene. Accordingly, when unclamping the above-described tool, it is necessary that an unclamping force F larger than the clamping force of the disk springs 9 be applied to the draw bar 3a. At the same time, also, the unclamping force F acts on the main spindle 2 as an axial force in the forward direction.

In the present embodiment, a structure enabling to support the axial force acting on the main spindle 2 is adopted in the rear bearing unit 5. The rear bearing unit 5 includes: a front ball bearing 10' and a rear ball bearing 10, which is a pair of angular ball bearings, an inner ring spacer 11 and an outer ring spacer 12.

The front ball bearing 10' and the rear ball bearing 10 have the same structure and the allowable axial load of the same size and direction. Each of the ball bearings 10, 10' includes: an inner ring 13 fitted to the outer peripheral surface of the main spindle 2 and an outer ring 14 fitted to the internal peripheral surface of a slide cylindrical body 6a disposed in the housing 6 in a freely movable manner in the axial direction, lots of balls (rolling elements) 15 disposed between orbital planes 14s, 13s of the outer ring 14 and the inner ring 13, respectively, and a holder 16 holding the respective balls at a predetermined pitch. Here, between an end face 6b of the slide cylindrical body 6a and a stepped portion 6c of the housing 6, a bias spring 17 biasing the slide cylindrical body 6a in the direction of an arrow "c" is made to intervene. With this, the rear bearing unit 5 is applied a required pre-load.

The inner ring spacer 11 is of a ring type slightly thinner than the inner ring 13, and a rear end face 11a thereof in the axial direction abuts onto a front end face 13a of the inner ring 13 of the rear ball bearing 10 and a front end face 11b of the inner ring spacer 11 abuts onto a rear end face 13b of the inner ring 13 of the front ball bearing 10'. Note that the inner ring spacer 11 is formed such that the outer diameter thereof on the rear end face 11a side becomes smaller than the outer diameter thereof on the front end face 11b side.

Meanwhile, the inner ring spacer 12 is of a ring type thicker than the outer ring 14, and a rear end face 12a thereof in the axial direction abuts onto a front end face 14a of the outer ring 14 of the rear ball bearing 10 and a front end face 12b thereof abuts onto a rear end face 14b of the outer ring 14 of the front ball bearing 10'.

The internal diameter of the outer ring spacer 12 is set to be slightly smaller than the outer diameter of the inner ring 13, and therefore, the internal peripheral edge portion of the outer ring spacer 12 on its rear end face 12a side faces the outer peripheral edge portion of the front end face 13a of the inner ring 13 of the rear ball bearing 10. On the facing face, a protrusion 12c is formed to have a ring shape.

Figure 5:
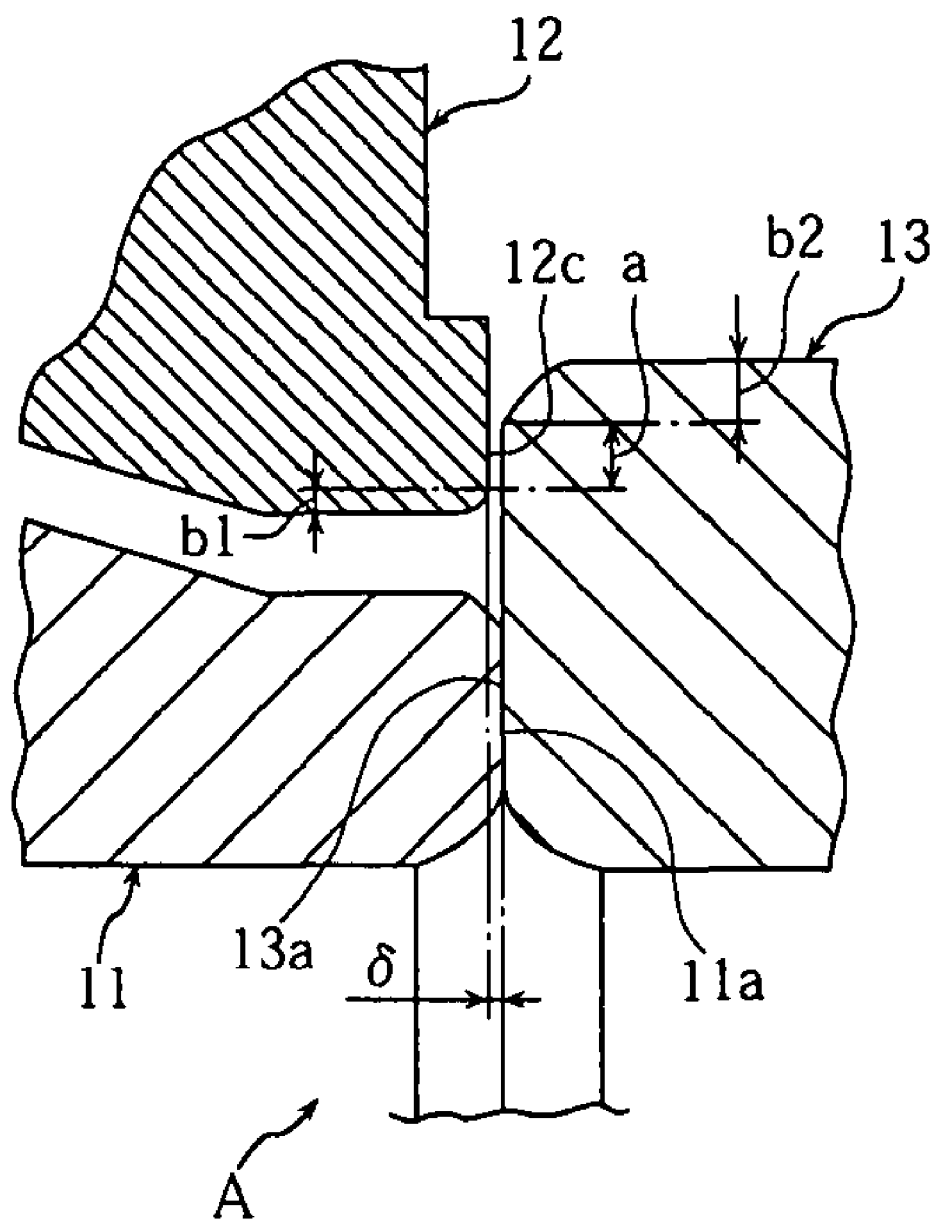
FIG. 5 is an enlarged view to illustrate an axial force transmitting direction shifting means.
Figure 6:
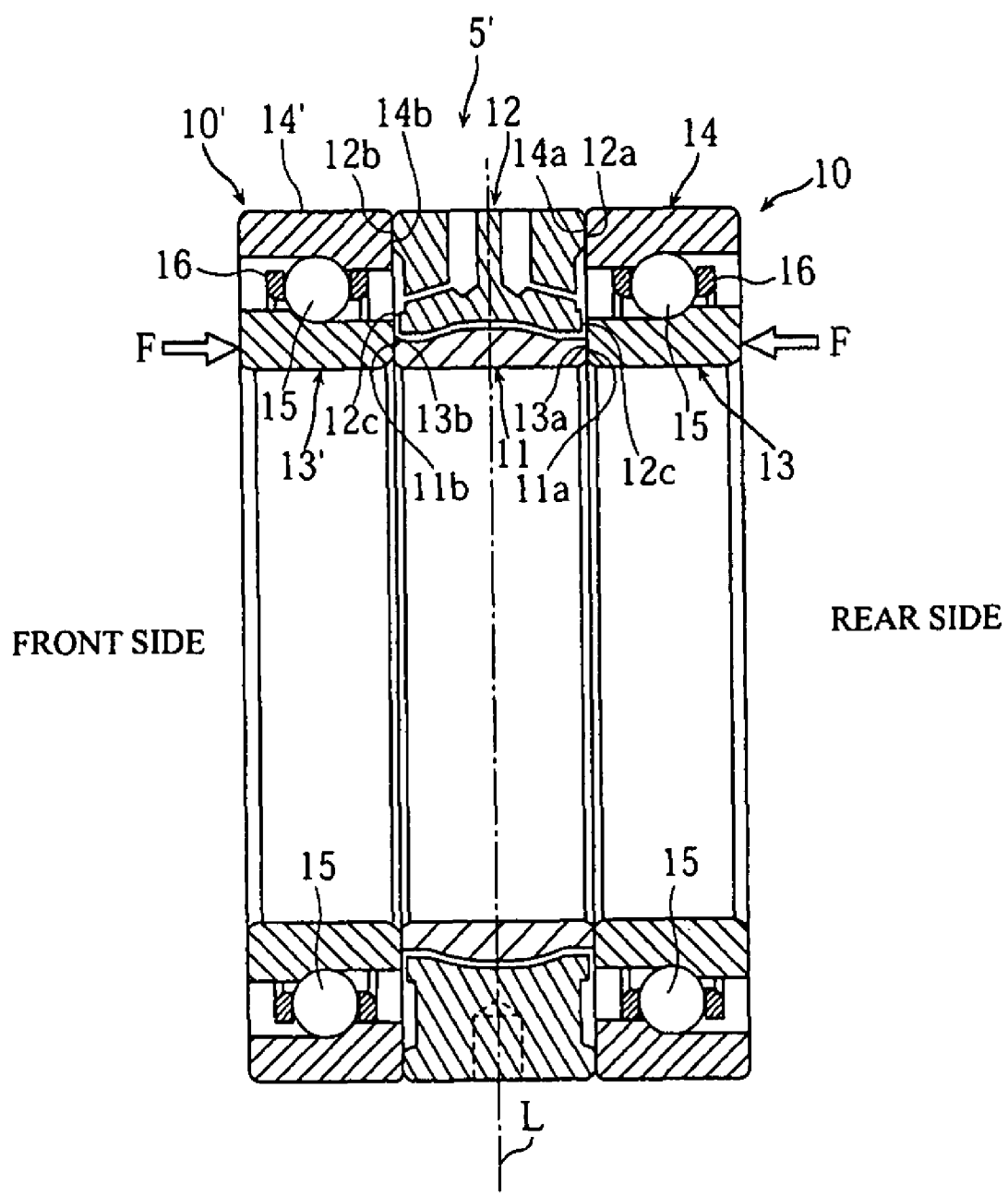
FIG. 6 is a sectional side view showing a modification example of the bearing unit.

As shown in an enlarged manner in FIG. 5, a space 6 between the protrusion 12c and the front end face 13a of the inner ring 13 of the rear ball bearing 10 is set to a value being smaller than the elastic deformation amount in the axial direction of the inner ring spacer 11 in the case where a predetermined axial force f smaller than the above-described allowable axial force acts, for example, to approximately 0.06 mm to 0.07 mm. Further, a substantial overlapping amount "a" of the protrusion 12c and the front end face 13a of the inner ring 13 in the radical direction is set to a level satisfying a required strength. Note that the "substantial overlapping amount" means the overlapping amount between the linear portions except chamfers b1, b2. Note that, in FIGS. 3, 4, "12d" is an oil hole to supply lubricant oil to between the balls 15 and the orbital plane.

Thus, when the unclamping force transmitted to the main spindle 2 exceeds the predetermined value f, the unclamping force is transmitted from the inner ring 13 of the rear ball bearing 10 to the outer ring 14 of the front ball bearing 10' via the outer ring spacer 12 and further to the housing 6, thereby an axial force direction shifting means A preventing excessive load from acting on between the balls 15 of the rear ball bearing 10 and the orbital planes is structured.

In the device of the present invention, when the unclamping force F from the unclamping mechanism is applied to the draw bar 3a, the draw bar 3a goes forward while pressing the disk springs 9 to release the engagement of the tool and the collet chuck 8, so that the tool is unclamped.

At this time, the unclamping force F is transmitted to the main spindle 2 via the disk springs 9, and further transmitted from a locking member 2d fixed to the main spindle 2 to the inner ring 13 of the rear ball bearing 10 of the rear bearing unit 5. As the unclamping force increases, contact pressure between the orbital planes of the inner and outer rings 13, 14 and the balls 15 increases, and at the same time, the inner ring, the outer ring, the rolling elements and the inner ring spacer 11 deform elastically in the axial direction. When the strength of the unclamping force F reaches to the predetermined axial force f, the elastic deformation amount of the inner ring, the outer ring and the inner ring spacer 11 reaches to the space 6, so that the front end face 13a of the inner ring 13 abuts onto the protrusion 12c of the outer ring spacer 12. Accordingly, thereafter, the unclamping force is transmitted to the outer ring 14 of the front ball bearing 10' via the outer ring spacer 12, and transmitted to the housing 6 therefrom via the slide cylindrical body 6a. Here, the allowable axial loads of the rear and front ball bearings 10, 10' are set to be larger than the above-described predetermined axial force f, so that no indentation or the like is generated on the orbital planes of the inner ring 13 and the outer ring 14 by the above-described unclamping operation.

As described above, according to the present embodiment, the mechanism of changing the unclamping-force transmission path is provided, in which when the unclamping force F transmitted to the inner ring 13 reaches to the predetermined force f or above, the unclamping force is transmitted from the inner ring 13 to the housing 6 via the outer ring spacer 12 and the outer ring 14, allowing the contact pressure between the orbital planes of the inner and outer rings 13, 14 and the balls 15 from increasing excessively, so that the problem of generating the indentations of the balls 15 on the orbital places of the inner and outer rings 13, 14 can be prevented.

Further, in the present embodiment, the transmitting direction shifting means is structured that the protrusion 12c of the outer ring spacer 12 contacts the front end face 13a of the inner ring 13 by providing the space 6 therebetween and that, when the axial force acting on the inner ring 13 reaches to the predetermined value f or above, the elastic deformation amount of the inner ring, the outer ring, the rolling elements and the inner ring spacer 11 reaches to the space 6 and thereby the front end face 13a of the inner ring 13 abuts onto the protrusion 12c of the outer ring spacer 12. Therefore, it is possible to change the transmission path of the axial force to the path from the inner ring 13 to the outer ring spacer 12, in which the above-descried operation and effect can be realized with a simple structure, so that the problems such as a complicated structure, a cost increase, an arrangement space increase and so forth can be prevented.

Note that, in the above-described embodiment, the description was given for the case where the rear bearing unit 5 is the combination of the rear ball bearing 10 and the front ball bearing 10' having the same structure, however, the present invention is also applicable to the case where the rear ball bearing 10 and the front ball bearing 10' are symmetrical in view of the front and rear direction by sandwiching an axial center line L therebetween, namely to a bearing unit 5' of which an allowable axial load direction is opposite. Note that, in this case, the inner ring spacer 11 and the outer ring spacer 12 are also symmetrical in view of the front and rear direction, and the outer ring spacer 12 includes the protrusion 12c on both the front end face and the rear end face thereof, respectively.

Further, in the present embodiment, the description was given for the case where the bearing unit is composed of the two pieces of rear and front ball bearings 10, 10', however, the present invention is also applicable to the case where the single piece of bearing unit is provided. Further, the applicable scope of the present invention is irrespective of the number of the ball bearing(s), and, for example, it is of course applicable to the bearing unit provided with four pieces of the ball bearings as shown in FIG. 7, in the case of FIG. 7, the rear and forward ball bearings 10, 10' are formed to be symmetrical in the front and real direction by sandwiching the axial center line L therebetween.

Furthermore, in the above-described embodiment, the description was given for the case of the ball bearing, however, the applicable scope of the present invention is not limited thereto, and, for example, a roller bearing with roller provided between the inner ring and the outer ring is applicable as well.

Moreover. In the above-described embodiment, the description was given for the case of the bearing unit disposed between the rotary shaft and the housing, however, the present invention is also applicable to the bearing disposed between the rotary shaft and a rotating cylindrical body; and in that case, the axial force is turned to the path from the rotating cylindrical body to the outer ring, the inner ring spacer, and the inner ring.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

This application is based on Japanese Patent Application No. 2006-304382 filed on Nov. 9, 2006, the contents of which are incorporated hereinto by reference.

What is claimed is:

1. A bearing unit comprising:
a bearing having an inner ring fitted to an inside member, an outer ring fitted to an outside member, and a plurality of rolling elements disposed between the outer ring and the inner ring; and
a transmitting direction shifting member for transmitting an axial force from at least one of the inner ring to the outside member and the outer ring to the inside member when the axial force transmitted from at least one of the inside member and the outside member to at least one of the inner ring and the outer ring becomes at least a predetermined value.

2. The bearing unit according to claim 1,
wherein the inside member is a rotary shaft and the outside member is a housing, wherein said transmitting direction shifting member includes: an inner ring spacer disposed at the rotary shaft side and restricting an axial movement of the inner ring and an outer ring spacer disposed at the housing side and restricting an axial movement of the outer ring, and wherein said transmitting direction shifting member is structured so that an elastic deformation amount of the inner ring, the outer ring, the rolling elements and the inner ring spacer becomes to a level that the inner ring abuts onto the outer ring spacer when the axial force acting on the inner ring becomes at least a predetermined value.

3. The bearing unit according to claim 1,
wherein the inside member is a fixed shaft and the outside member is a rotating cylindrical body, wherein said transmitting direction shifting member includes an inner ring spacer disposed at the fixed shaft side and restricting an axial movement of the inner ring and an outer ring spacer disposed at the rotating cylindrical body side and restricting an axial movement of the outer ring, and wherein said transmitting direction shifting member is structured so that an elastic deformation amount of the inner ring, the outer ring, the rolling elements and the inner ring spacer becomes to a level that the outer ring abuts onto the inner ring spacer when the axial force acting on the outer ring becomes at least a predetermined value.

4. A bearing unit comprising two bearings, an inner ring spacer and an outer ring spacer disposed between the bearings, wherein the bearings both include an inner ring fitted to a rotary shaft, an outer ring fitted to a housing, and a plurality of rolling elements disposed between the outer ring and the inner ring; and
a transmitting direction shifting member for transmitting an axial force from at least one of the inner rings to the housing and the outer, rings to the rotary shaft when the axial force transmitted from at least one of the rotary shaft and the housing to at least one of the inner rings and the outer rings becomes at least a predetermined value.

5. A main spindle device of a machine tool, comprising:
a main spindle driving to rotate a tool fitted to a tip portion thereof; a draw bar unit disposed in said main spindle and clamping/unclamping the tool with respect to the tip portion of said main spindle; a housing supporting said main spindle; and a bearing unit disposed between said housing and said main spindle includes: an inner ring fitted to the main spindle, an outer ring fitted to the housing, and a plurality of rolling elements disposed between the outer ring and the inner ring; and
a transmitting direction shifting member for transmitting an axial force from at least one of the inner ring to the housing and the outer ring to the main spindle when the axial force transmitted from at least one of the main spindle and the housing to at least one of the inner ring and the outer ring becomes at least a predetermined value.

* * * * *